United States Patent [19]

Brych

[11] Patent Number: 4,987,683
[45] Date of Patent: Jan. 29, 1991

[54] PERFORATION HAND PUNCH

[76] Inventor: Heinz Brych, Diedenhofener Str. 22, 5500 Trier, Fed. Rep. of Germany

[21] Appl. No.: 390,367

[22] Filed: Aug. 4, 1989

[51] Int. Cl.⁵ .......................... B26F 1/04; B26F 3/14; B26F 1/00
[52] U.S. Cl. ...................................... 30/363; 30/358; 30/359
[58] Field of Search ................. 30/363, 358, 359, 358, 30/359, 368, 367; 83/618, 620, 684, 694

[56] References Cited

U.S. PATENT DOCUMENTS

| | | | |
|---|---|---|---|
| 1,529,887 | 3/1925 | Harris et al. | 30/359 |
| 1,936,783 | 3/1931 | Chase | 30/358 |
| 3,672,055 | 6/1972 | Krueger | 30/358 |
| 3,748,737 | 7/1973 | Duff et al. | 30/358 |
| 4,020,554 | 5/1977 | LaTourette | 30/358 |
| 4,476,633 | 10/1984 | Brych | 30/363 |
| 4,768,693 | 9/1988 | Tomaszewski | 30/363 |

Primary Examiner—Douglas D. Watts
Assistant Examiner—Paul M. Heyrana, Sr.

[57] ABSTRACT

A perforation hand punch for coding cards has a coding field 31 in its male-female perforation arrangement having four columns and two rows. Accordingly, 4 punch pins may be distributed in a 8 punch pin positions 32, 34, 36, 37, 38, 39, 41 and 42 in a coded manner. Consequently more than 50 different person-related perforation coding can be provided which have 4 holes in each case as standard, so that the risk of forgery as a result of over-punching as in the case of mixed 2- and 4-hole coding is eliminated.

6 Claims, 3 Drawing Sheets

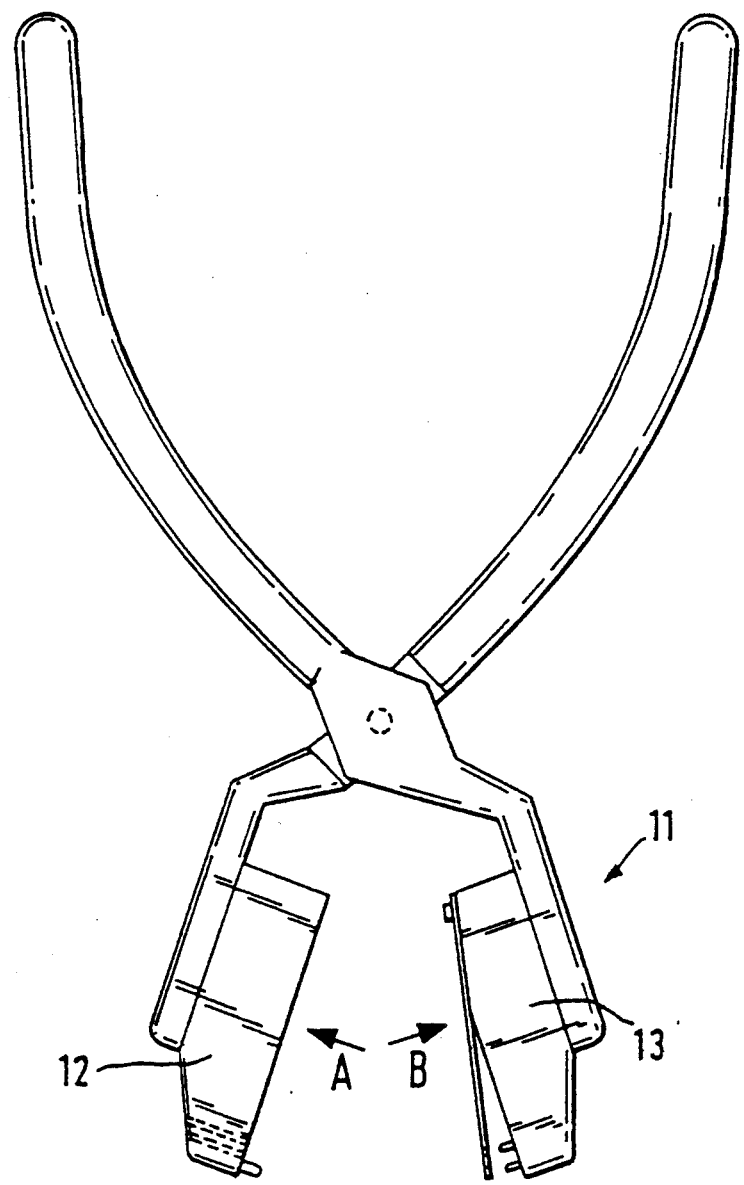

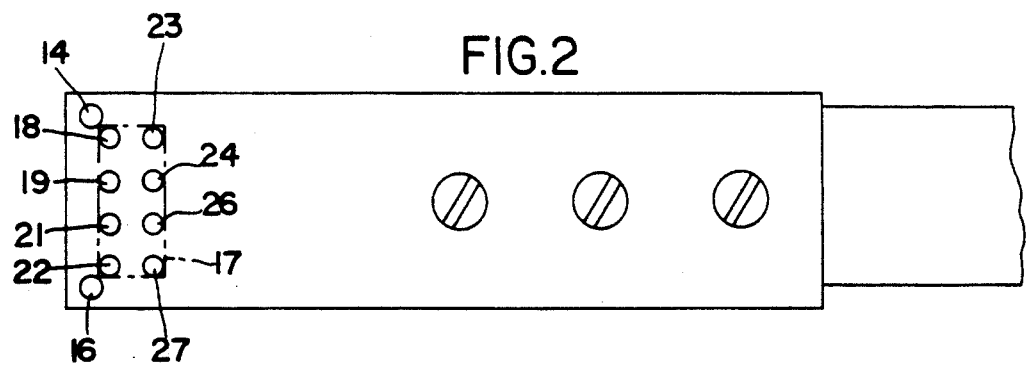
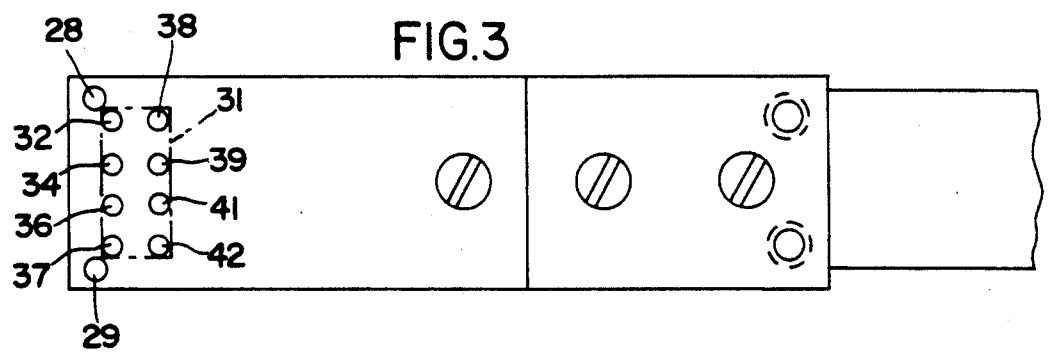
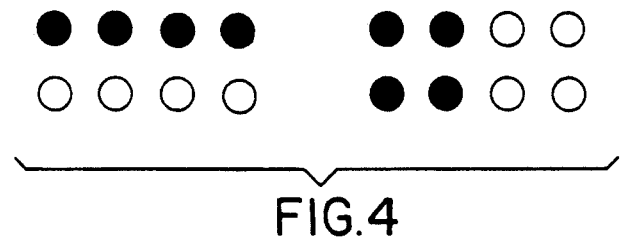

PERFORATION HAND PUNCH

This invention relates to a perforation hand punch of the type disclosed in U.S. Pat. No. 4,476,633, which issued Oct. 16, 1984, of the same inventor.

BACKGROUND OF THE INVENTION

Such a hand punch has the following disadvantages:.

(a) Of six possible punch positions (see FIG. 5 of U.S. Pat. No. 4,476,633) either two or four holes were punched in each case. Over a prolonged period the problem arose that two combinations of two can produce a combination of four if overpunched. Each waiter would like to have as high sales as possible, and it occurred that one waiter took a coding punch from another. If, for example, waiter No. 01 had sold an expensive bottle of cognac then waiter No. 11 is able to punch this overperforation so that the sales of waiter 01 are added to those of waiter 11. Because, however, the combination of twos also appears elsewhere in these combinations, it is impossible to demonstrate that waiter No. 11 has over-punched. It could just as well have been waiter No. 13 or 25.

(b) The fourth disadvantage of perforations in twos is that it cannot so readily be seen whether a field has already been punched so that it is possible to be mistaken. Not only can the waiter be mistaken, but it is also hardly possible for the customer to re-check correctly. At the same time, it has to be remembered that unhurried performance and very bright light are ruled out. The poor possibility of checking also stems from the fact that the combinations of two are badly situated spatially. For example, the 01 combination is situated on the diagonal and the 02 combination has the perforation situated unfavorably along the longitudinal edge.

(c) With the combination of twos and fours, one reaches only 30 waiters. Frequently, however, there are cases in which there are more than 50 serving employees.

(d) The known hand punch was recently patented by the Bundespatentgericht (Federal German Patent Court) as German Pat. No. 3,045,211.0-53. The locating pins 33, 34 mentioned in that patent specification have t enter locating holes 72, 75 before punching can be carried out so that the punchings can be situated in a system of rectangular coordinates. This is important for the tallying machine. Of course, the nearer the locating holes are situated to one another, the greater is the extent of tilting.

The known hand punch has a male-female perforation arrangement with planes oriented approximately parallel and opposite one another in a closed condition of the perforation hand punch. One of the planes has a first coding field with a multiplicity of punched holes, and the other plane has a coding field with a multiplicity of corresponding receiving holes for punch pins situated perpendicular to the plane. Two locating pins provided at a longitudinal edge of one of the coding fields.

OBJECT AND STATEMENT OF THE INVENTION

The object of the invention is to provide a coding punch which avoids the disadvantages described above, which does not compel personnel and customers to fundamentally change their habits, which makes it possible to retain the same punch system, and above all, makes it possible to continue to use the old card readers, at least in terms of the system, and at most with minor internal conversion.

According to the invention, this object is achieved by the following features:

(a) eight punched holes and eight receiving holes are arranged four in a row, and (b) the locating pins have a larger spacing than required for a column of punched holes and receiving holes.

The exemplary embodiments include the following additional advantageous features:

The locating pins have a center-to-center spacing of 10.5 mm. As a result, the old cards can no longer be punched with the new hand punches, a substantially wider locating base is achieved, and sufficient width is provided for a further column of punched holes and receiving holes.

The locating holes have a diameter of 1.47 mm. As a result, the old locating pins can also be used in the new hand punch, and it is not necessary to carry new stock. It is also not necessary to alter the punch pins in the punch tool. They can continue to be used.

One row has a perpendicular center-to-center spacing of 1.25 mm from the locating pins, and the other row has a perpendicular center-to-center spacing of 2.5 mm from the locating pins. As a result, the new cards punched which such dimension can be read in old card readers, which are little changed, identical in basic principle and which these dimensions. The production of new punch tools is also simplified since recourse can be made to already existing templates, devices and experience.

The punched holes and receiving holes have a center-to-center spacing of 2.5 mm each. This contributes to minimal reorganization in producing hand punches, punch tools for the cards and card readers.

The vertical rectangular spacing of the first and last punched hole from a locating pin situated in front thereof is in each case 1.5 mm. As a result, the punching fits the index track configuration, which has only been partly altered. In addition, each coding field centrally located with respect to the locating pins and the through-holes that receive the locating pins.

DESCRIPTION OF THE DRAWINGS

The invention is now described with reference to preferred exemplary embodiments. In the drawings:

FIG. 1 shows the plan view of a hand punch,

FIG. 2 shows a view in the direction of the arrow A in FIG. 1,

FIG. 3 shows a view along the narrow B in FIG. 1, but without a leaf spring,

FIG. 4 shows the view of two possible arrangements of punched holes from a multiplicity of possible arrangements.

DETAILED DESCRIPTION OF THE PREFERRED EMBODIMENTS

Figure 5:
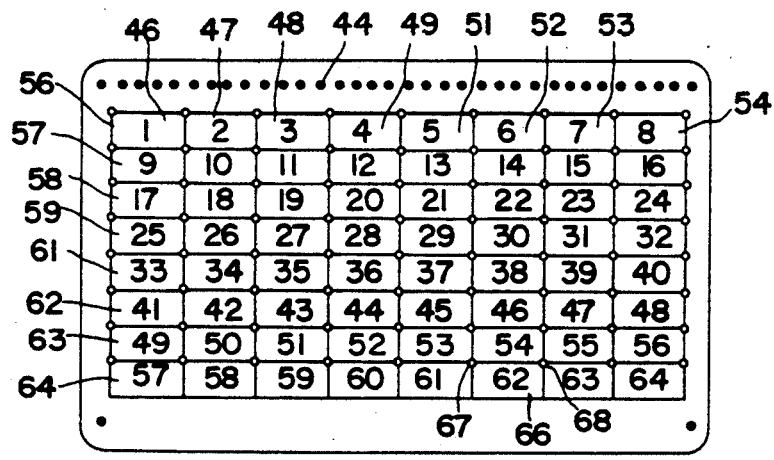
FIG. 5 shows a 64 position card.
Figure 6:
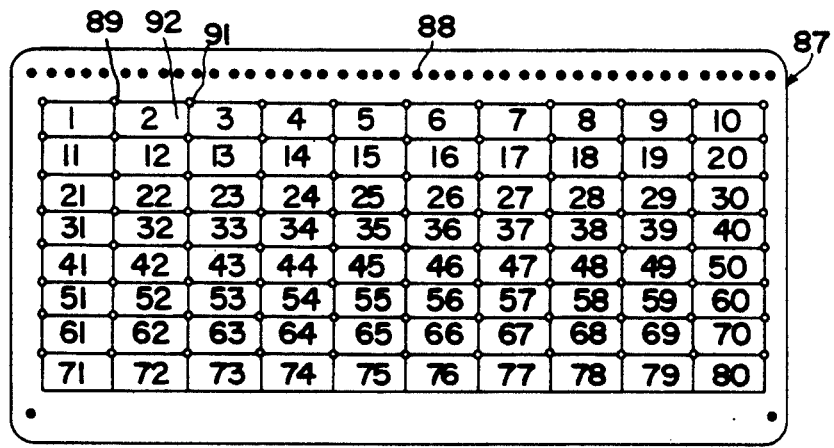
FIG. 6 shows the plan view of an 80 position card.

A hand punch 11 has two shoes 12, 13. The shoe 12 has two locating pins 14, 16 which, analogously to FIG. 7, have a center-to-center spacing of 10.5 mm and a diameter of 1.47 mm. According to FIG. 2, provided on the right of them are eight through-holes 18, 19, 21, 22, 23, 24, 26, 27 in a coding field 17. They have a diameter of about 1.3 mm. The center-to-center spacing of the throughholes 18, 19, 21, 22 is 2.5 mm. The same applies to the through-holes 23, 24, 26, 27.

In shoe 13, through-holes 28, 29 are provided, the through-hole 29 receiving the locating pin 14 and the through-hole 28 receiving the locating pin 16 when the hand punch 11 is closed. In the closed state of the hand punch 11, a coding field 31 is in coincidence with the coding field 17. Provided within the coding field 31 are punch pin positions 32, 34, 36, 37 whose center-to-center spacing is also 2.5 mm and punch pin positions 38, 39, 41, 42 are furthermore provided in the same pattern. The term "positions" is used because not all the punch pins have in fact to be present in accordance with FIG. 4. If punch pins are inserted into the punch pin positions, they penetrate into one of the through-holes 18 to 27 when the hand punch 11 is closed and consequently punch hole sin a card which will be described later. Of the eight punch pin positions 32 to 42 only four are provided in each case, in a varying arrangement, for identifying the person serving. Punch pins in the punch pin positions 32 to 42 have a diameter of 1.5 mm. The through-holes 18 to 27 correspond in coincidence to the punch pin positions 32 to 42. With their center-to-center spacing of 10.5 mm, the locating pins 14, 16 are further apart than in the known hand punch and to this extent, the shoes 12, 13 corresponding to this dimension are wider.

FIG. 4 shows on the left a combination in which the punch pin positions 32, 34, 36 and 37 are occupied by punch pins, while the other punch pin positions are empty. The number "01" could, for example, be allocated to this combination. On the right of FIG. 4 a combination is shown in which the punch pin positions 36, 37, 41, 42 are occupied by punch pins, while the four other positions are empty. The number "02" could for example be allocated to this combination.

According to FIG. 5 a card 43, which is drawn there on a scale of 1:1, is 55 mm high and 101 mm long. It is composed of the normal material, for example Syntape. The card 43 has an index track 44. There are eight columns 46, 47, 48, 49, 51, 52, 53, 54 and eight rows 56, 57, 58, 59, 61, 62, 63, 64 provided in punch fields 66. All the punch fields 66 are equally large and according to FIG. 5, arranged in accordance with rectangular coordinates. Each punch field 6 has two locating holes 67, 68 which belong to the punch field situated below them according to FIG. 5. The locating pins 14, 16 of the hand punch 11 engage din said locating holes 67, 68 during perforation and holes in accordance with patterns analogous to FIG. 4 are then produced in the punch fields 66 depending on the occupation of the punch pin positions 32 to 42. In this connection, the horizontal extension of the pattern according to FIG. 4 corresponds to the horizontal extension of the card 43 according to FIG. 5.

Figure 7:
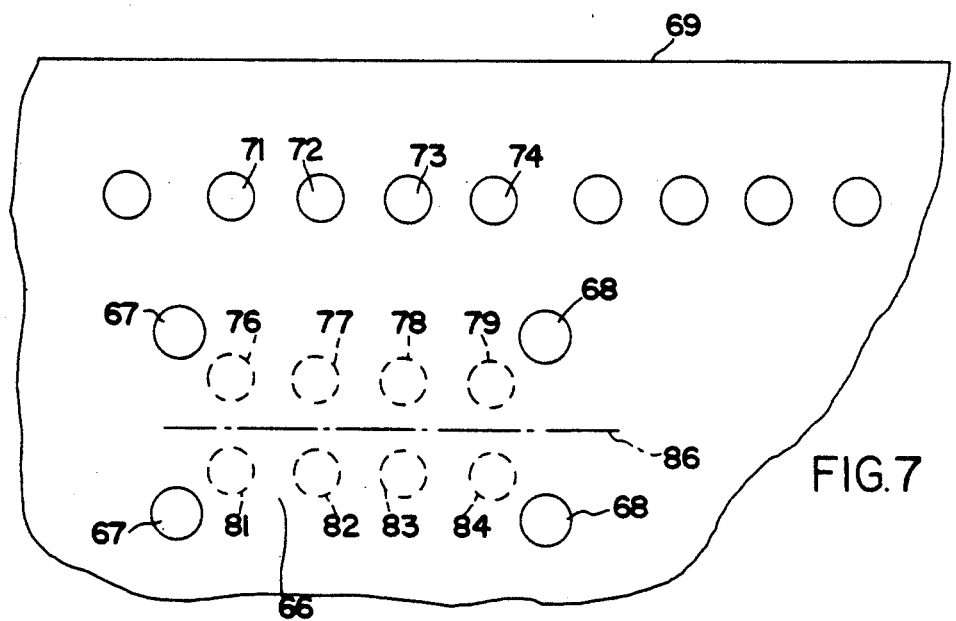
FIG. 7 shows a view of a punch field situated in the upper peripheral region of a card.

A more precise arrangement emerges from FIG. 7. According to this, the center of the rows of the index track 44 has a spacing of 3.75 mm from the top edge 69. The locating holes 67, 68 of the uppermost row are at a distance of 7.5 mm from the top edge 69 and the locating holes 67, 68 situated thereunder have a center-to-center spacing of 5 mm. The horizontal center-to-center spacing of the locating holes 67, 68 is 10.5 mm. In each case four index holes 71, 72, 73, 74 which have a center-to-center spacing from one another of 2.5 mm and a diameter of 1.3 mm fit precisely symmetrically into this spacing. The adjacent group of index holes on the left or right thereof has a spacing of 3 mm. From FIG. 5 it is also evident that this spacing is greater than the mutual spacing of the index holes 71 to 74. Projected vertically downwards, the first index hole 71 has a center-to-center spacing of 1.5 mm from the locating hole 67 and the index hole 74 also has this spacing from the locating hole 68, so that the 3 mm spacing between the index holes 71, 72, 73, 74 of each group is divided into 2×1.5 mm.

In the punch field 66 situated beneath the top locating holes 67, 68, eight punch positions 76, 77, 78, 79, 81, 82, 83 and 84 are provided analogously to FIG. 4. Situated under one another are the index hole 71 and the punch positions 76, 81, and the index hole 82 and the punch positions 77, 82 etc. The spacings from one another and—measured perpendicularly—also the spacings from the locating holes 67, 68 result from this. The punch field 66 can be divided by a center line 86 on the basis of its height between the locating holes 67, 68 and the punch positions 76, 77, 78, 79 on the one hand, and 81, 82, 83, 84 on the other hand, are situated in parallel and also symmetrically with respect thereto. This arrangement described here very precisely, of the index holes 71, 72, 73, 74 applies for each of the columns 46 to 54 and the arrangement of the locating holes 67, 68 also applies for all the punch fields 66.

An 80-position card 87 is also 55 mm high and 11.2 mm long. The index track shown there has the same structure as the index track 44, but is correspondingly longer. Arranged in the same way as the locating holes 67, 68 are also the locating holes 89, 91 which define a punch field 92 geometrically identical to the punch field 66.

There have now been numerous attempts to solve the cashing up in a more contemporary, modern way. Magnetizable cards have the basic disadvantage that the magnetic information can easily be altered deliberately or unintentionally. The main disadvantage is, however, that the information is anonymous. If, for example, a customer says that he has not had this or that, he cannot be shown in practice how the cancellation of the card was carried out. On the basis of the card perforation which is clearly visible to the eye, the customer can, however, be shown where he was in sequence since at one point the hand punch with a particular number is used, at another point a hand punch with a second number is used and at a third point a hand punch with a third number (coding) is used.

Chip cards also fail to provide a satisfactory solution.

I claim:

1. A perforation hand punch for coding cards having,
    a male-female perforation arrangement with planes oriented approximately parallel and opposite one another in a closed condition of the perforation hand punch, one of the planes having a first coding field with a multiplicity of punched holes and the other plane having a coding field with a multiplicity of corresponding receiving holes for punch pins situated perpendicular to the plane, and
    two locating pins provided at a longitudinal edge of one of the coding fields, wherein
    (a) eight punched holes and eight receiving holes are arranged four in a row, and
    (b) the locating pins have a larger spacing than required for a column of punched holes and receiving holes.

2. The perforation hand punch as claimed in claim 1, wherein the locating pins have a center-to-center spacing of 10.5 mm.

3. The perforation hand punch as claimed in claim 1, wherein the locating holes have a diameter of 1.47 mm.

4. The perforation hand punch as claimed in claim 1, wherein one row has a perpendicular center-to-center spacing of 1.25 mm from the locating pins and the other row has a perpendicular center-to-center spacing of 2.5 mm from the locating pins.

5. The perforation hand punch as claimed in claim 1, wherein the punched holes and receiving holes have a center-to-center spacing of 2.5 mm each.

6. The perforation hand punch as claimed in claim 1, wherein the vertical rectangular spacing of a first and last punched hole from a locating pin situated in front thereof is in each case 1.5 mm.

* * * * *